US010470383B2

(12) United States Patent
Maxwell

(10) Patent No.: US 10,470,383 B2
(45) Date of Patent: Nov. 12, 2019

(54) HYDROPONIC GROWING SYSTEM AND METHODS OF MAKING AND USING THE SAME

(71) Applicant: Scott Maxwell, Arcadia, CA (US)

(72) Inventor: Scott Maxwell, Arcadia, CA (US)

( * ) Notice: Subject to any disclaimer, the term of this patent is extended or adjusted under 35 U.S.C. 154(b) by 193 days.

(21) Appl. No.: 15/798,436

(22) Filed: Oct. 31, 2017

(65) Prior Publication Data

US 2019/0124866 A1 May 2, 2019

(51) Int. Cl.

*A01G 31/06* (2006.01)
*H04L 29/08* (2006.01)
*A01G 7/04* (2006.01)

(52) U.S. Cl.

CPC .............. *A01G 31/06* (2013.01); *A01G 7/045* (2013.01); *H04L 67/12* (2013.01)

(58) Field of Classification Search

CPC ........ A01G 31/06; A01G 9/033; A01G 9/045; A01G 9/047; A01G 18/62

See application file for complete search history.

(56) References Cited

U.S. PATENT DOCUMENTS 4,276,720 A * 7/1981 Lyon ...................... A01G 27/04 47/14
4,493,163 A * 1/1985 de Monbrison ....... A01G 31/06 47/61
5,481,826 A * 1/1996 Dickinson ................ A01G 9/04 47/39
6,314,679 B1 * 11/2001 White .................. A01G 9/0295 47/39
6,651,384 B1 * 11/2003 Williames ............ A01G 9/0295 47/86
7,020,997 B1 * 4/2006 Thomas ................. A01G 9/028 47/39
2006/0242901 A1 * 11/2006 Casimaty ............... A63C 19/00 47/65.9
2010/0175319 A1 * 7/2010 Meeks ..................... A01G 9/02 47/79
2012/0060416 A1 * 3/2012 Brusatore .............. A01G 31/06 47/62 A
2014/0090294 A1 * 4/2014 VanWingerden ........ A01G 9/02 47/66.7
2015/0135588 A1 * 5/2015 Gergek .................. A47G 7/041 47/65.5
2016/0029572 A1 * 2/2016 Stott .................... A01G 9/0297 47/66.7

* cited by examiner

*Primary Examiner* — Monica L Williams
(74) *Attorney, Agent, or Firm* — NK Patent Law

(57) ABSTRACT

The presently disclosed subject matter is broadly directed to a hydroponic growing system. The disclosed system is a soil-free plant growth system comprising a water solution that includes dissolved nutrients and oxygen. The roots of the plants are submerged into the nutrient-laden aqueous solution, thereby providing nutrition to the plant. In this way, the exact amount of water, nutrients, and oxygen can be provided. The disclosed system further comprises an irrigation subsystem, environmental subsystem, and control subsystem that allows the system to be customized and motorized depending on the plant grown and the grow desired grow conditions.

20 Claims, 19 Drawing Sheets

HYDROPONIC GROWING SYSTEM AND METHODS OF MAKING AND USING THE SAME

TECHNICAL FIELD

The presently disclosed subject matter is directed to a stackable hydroponic system for growing plants, and to methods of making and using the disclosed system.

BACKGROUND

Hydroponics is the practice of growing crops or other plants without a soil medium. The plants are provided with all required nutrients through exposure to an aqueous solution containing dissolved nutrients and oxygen. There are numerous advantages of hydroponic growing systems. Such advantages include providing a soil-free environment, reusing water to achieve lowered water expenses, minimizing waste of nutrients and/or underfeeding of plants through precise control of nutrition levels, and the production of stable and predictably high crop yields. As such, in comparison to conventional soil-based plant growing systems, hydroponics tends to be more effective and environmentally friendly. There are numerous prior art hydroponic growing systems. However, such systems are typically complex, requiring bulky tables that have a large surface area. Further, because trays of plants on traditional growing tables require significant horizontal space, the prior art systems can be costly and inefficient. It would therefore be advantageous to provide an improved hydroponics system that overcomes the cited shortcomings of the prior art.

SUMMARY

In some embodiments, the presently disclosed subject matter is directed to a hydroponic assembly comprising a tray and a support. The tray comprises a plurality of sidewalls joined to a bottom face to provide an interior compartment, a plurality of raised plateaus configured on the bottom face of the tray, and a plurality of channels defined on the bottom face, positioned between the raised plateaus. The tray further comprises a fill port positioned on one sidewall, a drain port positioned on the bottom face, and a lip positioned at a top edge of the sidewalls extending about the perimeter of the sidewalls. The support comprises a plurality of legs comprising a top portion and a bottom portion, a plurality of connectors comprising an internal recess sized and shaped to house the plurality of legs, and horizontal arms connecting the legs. The support further comprises a plurality of raised ridges, sized and shaped to conform to the size and shape of the plurality of raised plateaus. The assembly is configured such that the tray lip is configured to rest on the top surface of the support arms, and the tray plateaus are supported by the support ridges. The tray can be maintained on the support by attaching the tray lip to the upper horizontal arm of the support through the use of one or more attachment elements, such as clips or other mechanical joining devices. Further, the assemblies are vertically stackable.

In some embodiments, the tray has a thickness of about 1 inch or less.

In some embodiments, the tray plateaus have a height of about 1-2 inches.

In some embodiments, the area beneath the channels is open.

In some embodiments, the area beneath the support ridges is open. In some embodiments, the area under the channels is open.

In some embodiments, the supports are vertically stackable.

In some embodiments, the presently disclosed subject matter is directed to a hydroponic growing system comprising the disclosed assembly. The system further comprises a fertigation subsystem, an environmental subsystem, and a control subsystem.

In some embodiments, the irrigation subsystem comprises a reservoir housing water comprising dissolved nutrients, a feed line connecting the reservoir to the fill port of the tray, and a return line connecting the drain port of the tray with the reservoir, the fill port of another tray, or a disposal element.

In some embodiments, nutrients are automatically added to the reservoir, the pH is automatically adjusted, or both based on user input or plant information.

In some embodiments, the system further comprises one or more sensors to read and manage the pH level, oxygen level, water level, additives, temperature, or combinations thereof of the water within the reservoir. In some embodiments, the sensors are connected to a communication element to allow a controller to track and record input and take appropriate corrective action.

In some embodiments, the environmental subsystem controls and maintains the area surrounding the disclosed hydroponic assembly. In some embodiments, the environmental subsystem comprises sensors to read and record the temperature, relative humidity, air levels, or combinations thereof within the growing environment; and controllers to take corrective action to return the growing environment to desired parameters.

In some embodiments, the environmental subsystem comprises a plurality of light sources customized for a desired growing condition. In some embodiments, the light sources are configured above the internal compartment of the tray. In some embodiments, the light source, intensity, or both is customized based on a desired growing condition.

In some embodiments, the control subsystem comprises a programmed computer or other processor-based device.

In some embodiments, the disclosed system further comprises one or more sensors that can measure air temperature, water temperature, water input, water output, $O_2$, $CO_2$, pH, nutrients, lighting output, lighting timing, PAR, spectrum, and combinations thereof.

In some embodiments, the system further comprises a controller configured to accept data inputs from the system sensors to perform one or more necessary calculations related to an irrigation event, injection rates for the nutrition or pH components added to the reservoir, light source calculations, corrections for relative humidity, temperature, or combinations thereof.

In some embodiments, the system comprises a data recording element configured to read data transmitted from the sensors.

In some embodiments, the system comprises a remote server that can communicate with the one or more sensing devices and receive data captured by the sensors and store the captured data on the server.

In some embodiments, the presently disclosed subject matter is directed to a method of growing plants. The method comprises comprising the disclosed apparatus and/or system. The method further comprises placing plants or plant seeds on the disclosed plateaus, activating a fertigation pump for selected time periods to pump water from the reservoir into each tray. The method further comprises activating the light source for selected time periods to accelerate plant growth.

BRIEF DESCRIPTION OF THE DRAWINGS

The previous summary and the following detailed descriptions are to be read in view of the drawings, which illustrate some (but not all) embodiments of the presently disclosed subject matter.

DETAILED DESCRIPTION

Figure 1:
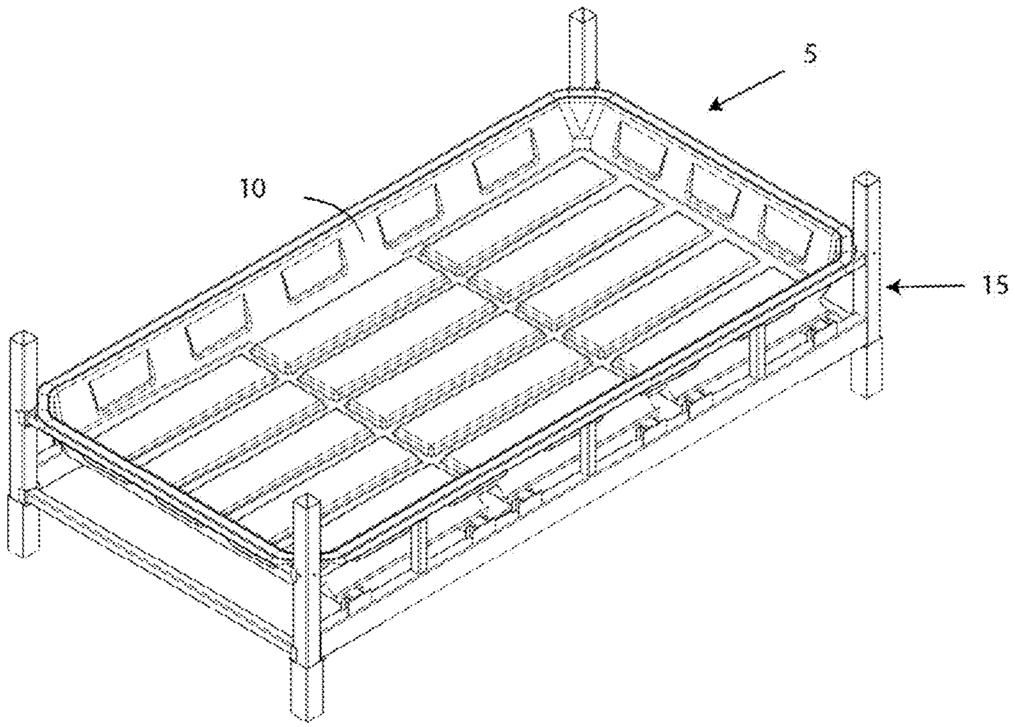
FIG. 1 is a perspective view of one embodiment of the presently disclosed hydroponics growing system.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter. Like numbers in the drawings refer to like elements.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms “a”, “an”, and “the” refer to “one or more” when used in the subject specification, including the claims. Thus, for example, reference to “a sensor” can include a plurality of such sensors, and so forth.

Unless otherwise indicated, all numbers expressing quantities of components, conditions, and so forth used in the specification and claims are to be understood as being modified in all instances by the term “about”. Accordingly, unless indicated to the contrary, the numerical parameters set forth in the instant specification and attached claims are approximations that can vary depending upon the desired properties sought to be obtained by the presently disclosed subject matter.

As used herein, the term “about”, when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

The presently disclosed subject matter is broadly directed to a hydroponic growing system. The term “hydroponic” as used herein refers to a soil-free plant growth system comprising a water solution that includes dissolved nutrients and oxygen. The roots of the plants are submerged in the nutrient-laden aqueous solution, thereby providing nutrition to the plant. In this way, the exact amount of water, nutrients, and oxygen can be provided. One embodiment of the disclosed system is shown in FIG. 1, illustrating table 5 comprising tray 10 and support 15 that can be stacked to provide a multilayer table, as set forth in more detail herein below.

Figure 2A:
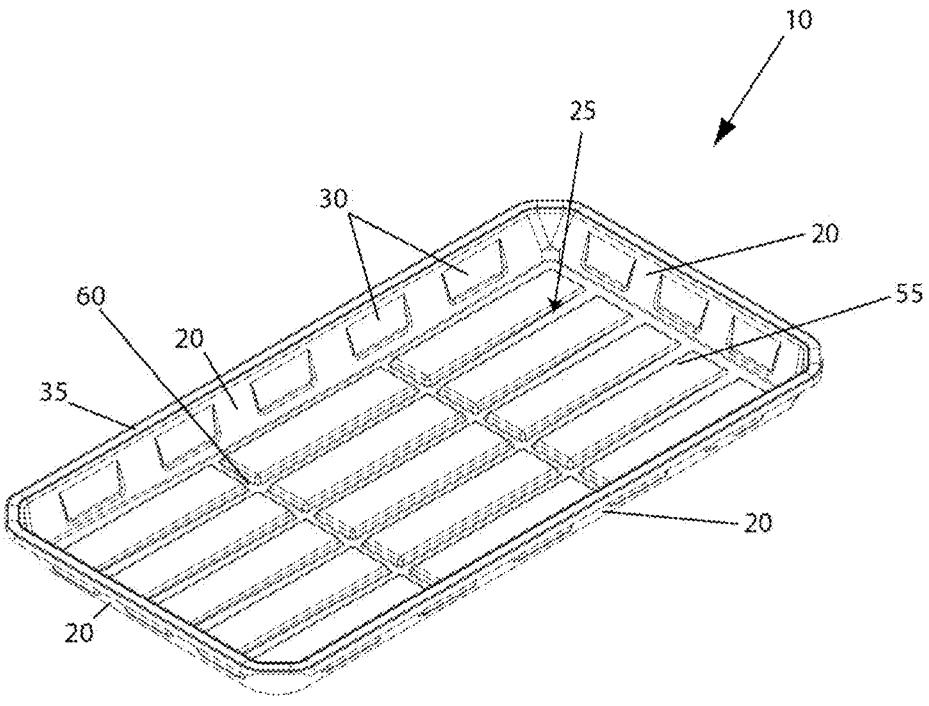
FIG. 2*a* is a perspective view of one embodiment of a tray in accordance with the presently disclosed subject matter.

FIG. 2*a* depicts one embodiment of a tray constructed and arranged according to the disclosed system. Particularly, tray 10 functions as a vessel for retaining plants and the aqueous nutrient solution. The tray is thin-walled and non-supporting. Tray 10 includes side walls 20 that connect with bottom face 25 to define an interior compartment for housing the aqueous solution and plants. The top perimeter of side wall 20 comprises continuous outwardly-extending lip 35. Lip 35 can be positioned on each side wall, or fewer than all side walls. In some embodiments, the lip can be curved outwardly away from side walls 20 (i.e., away from the interior of the tray), although the shape of the lip is not limited. When the tray is inserted into support 15, the lip rests on the top edge of the support and is secured thereto, as set forth in more detail herein below.

In some embodiments, bottom face 25 has a smaller area than the top edge of the side walls, resulting in the side walls being angled to allow for multiple trays to nest within each other during storage. As shown in FIG. 2*a*, the tray can comprise four side walls, such as in embodiments when the tray is square or rectangular in shape. However, the tray can include any number of side walls (i.e., 3 side walls when the tray is triangular-shaped, or 1 rounded side wall when the tray is circular-shaped). Thus, the shape of tray 10 is not limited and be configured as rectangular, square, triangular, hexagonal, circular, or oval (among others) in design.

In some embodiments, side walls 20 comprise one or more indentations 30 that function to add rigidity and/or stiffness to provide additional support to the sidewalls. As shown in FIG. 2*a*, the indentations can extend outward from the interior of the tray, (i.e., away from the interior compartment of the tray). Although depicted as rectangular in shape, indentations 30 can be configured in any desired size or shape. Further, any desired numbers of indentations can be configured in side walls 20.

Figure 2B:
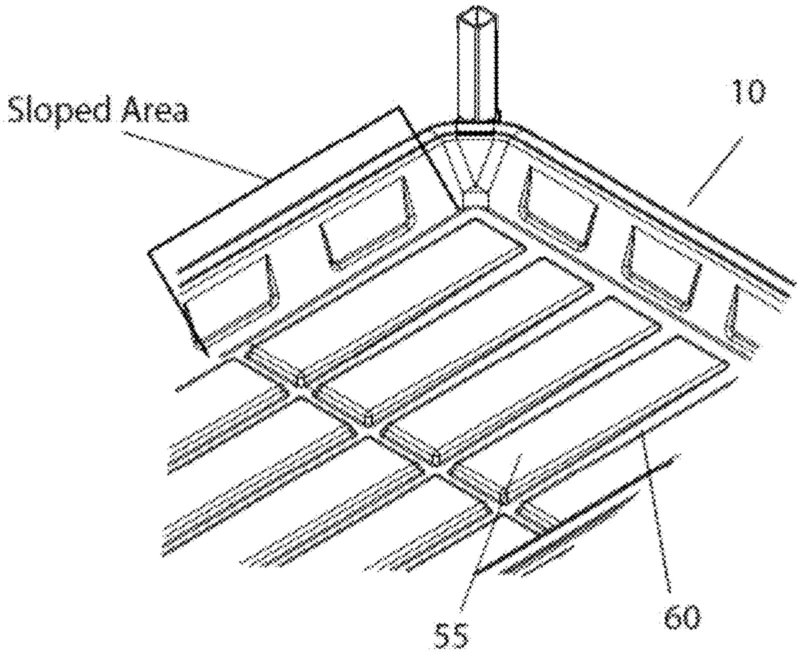
FIG. 2*b* is a cutaway view of one embodiment of a tray that includes a sloped area.

Bottom face 25 comprises a plurality of raised plateaus 55 onto which plants are positioned. Thus, one or more plant-containing vessels can be placed directly on the plateaus. In some embodiments, the vessels comprise the plants and one or more fillers, such as (but not limited to) sand, clay balls, and the like. Alternatively, in some embodiments, the plants themselves can be placed directly on the plateaus (i.e., no vessels are required). The raised plateaus create drainage channels 60 therebetween, as illustrated in FIG. 2*a*. In some embodiments, the drainage channels can run to one side of the tray, or can be placed in the approximate middle portion of the tray. Nutrient-laden water flows into channels 60 during filling of the tray to give the plant roots access to the water and nutrients. Plateaus 55 support the plants, accommodate plant storage and root enlargement, and allow the plants to move upwardly as the roots enlarge and the plant grows. Plateaus 55 and/or channels 60 can all be uniform in size, or can be of varying sizes and shapes. For example, channels 60 can be square or rectangular in shape, and the plateaus can have a height of about 1-2 inches. However, it should be appreciated that the shape, depth, slope, and length of channels 60 and plateaus 55 are not limited and can be varied according to growing and/or plant conditions. Further, as shown in FIG. 2*b*, in some embodiments the channels can be sloped and the drain fitting can form a smooth, lip-free surface, thereby preventing a space for the buildup of liquid.

Figure 3A:
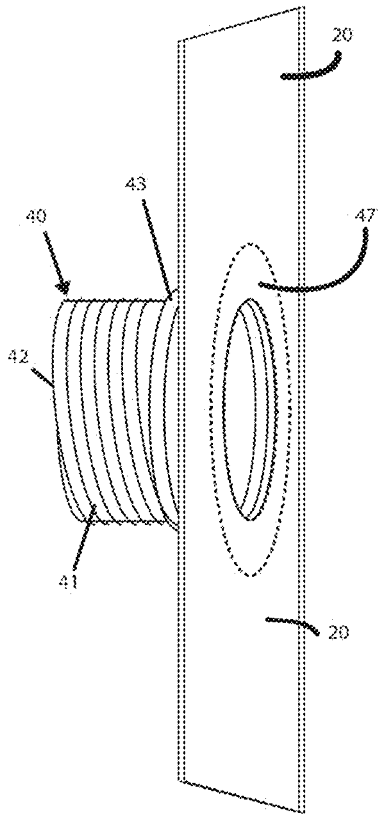
FIG. 3*a* is a perspective view of a fill port in accordance with some embodiments of the presently disclosed subject matter.
Figure 3B:
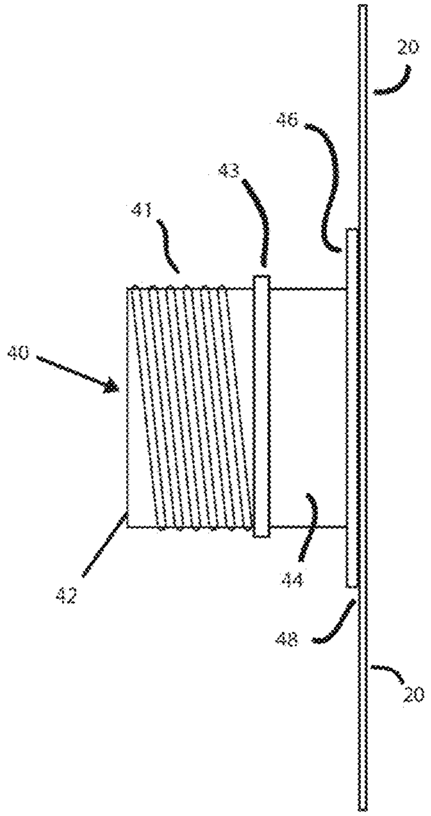
FIG. 3*b* is a side plan view of the fill port of FIG. 3*a.*

As shown in FIGS. 3*a* and 3*b*, tray 10 comprises fill port 40 that extends through sidewall 20 and is used to fill the interior compartment of the tray to a desired level with nutrient-laden water. In some embodiments, the fill port comprises one or more threads 41 that cooperate with tubing or a cap or other stop unit that can be secured over first end 42 to stop the influx of water and/or to protect the fill port when desired by the user. Adjacent to threads 41, the fill port can comprise thread stop 43 that can be used to stop advancement of the cap or stop unit. Neck 44 can be positioned adjacent to the thread stop to allow enough clearance for a cap or other stop unit to be positioned over the first end of the fill port. Fill port 40 can be attached to the tray side wall using any method known or used in the art. For example, as shown in FIG. 3*b*, the fill port can comprise flange 46 that can be directly attached to one face of the tray via attachment area 47, which can include (but is not limited to) a heat seal area, adhesive area, welding area, mechanical closure area, and the like. Accordingly, the attachment area can comprise heat weld 48 or sonic weld to facilitate attachment of the fill port to the tray. It should be appreciated that fill port 40 can be attached to a side wall of the interior or exterior of the tray. However, the presently disclosed subject matter is not limited and the fill port can be positioned on any face of tray 10.

Fill port 40 can function as an overflow port, setting the fill height of the tray to a desired level. In these embodiments, applicable tubing can be connected to the fill port to allow transfer overflow of nutrient-laden water to another tray or to be recycled or disposed of. A cap (not shown) can be threaded over first end 42 of the fill port if the user desires for the water level to go above the level of the fill port.

Figure 3C:
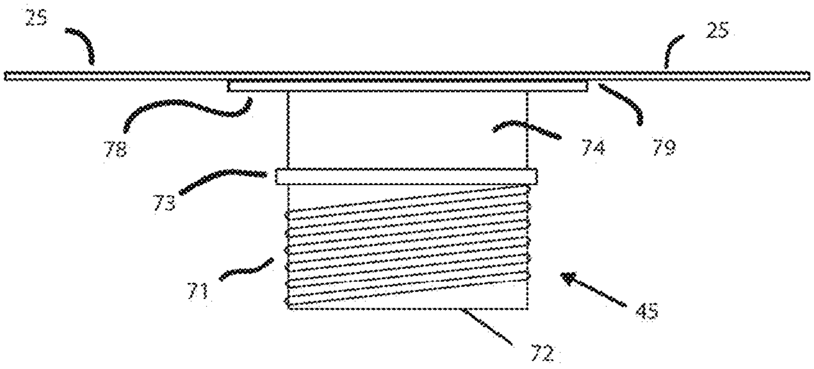
FIG. 3*c* is a side plan view of a drain port in accordance with some embodiments of the presently disclosed subject matter.
Figure 3D:
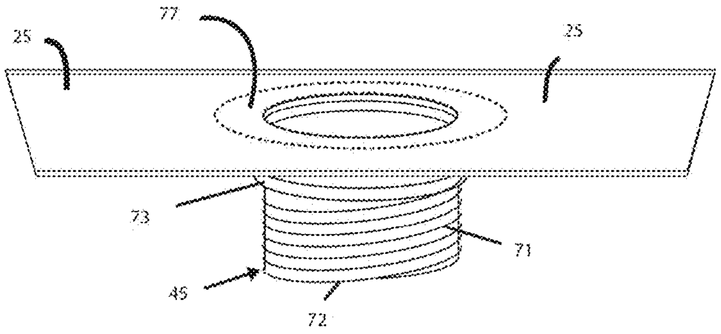
FIG. 3*d* is a perspective view of the drain port of FIG. 3*c.*

Bottom face 25 further comprises drain port 45, as illustrated in FIGS. 3*c* and 3*d*. Drain port 45 extends through bottom face 25 of the tray and is used to drain water from the interior of the tray. In some embodiments, drain port 45 comprises threads 71 that cooperate with tubing to route the water to a reservoir, other tray, or to be disposed of. Alternatively, the threads can be used to secure a cap or other stop unit over first end 72 to stop the exit of water from the tray and/or to protect the drain port when desired by the user. Adjacent to threads 72, the drain port can comprise stop 73 used to stop advancement of the associated tubing. Neck 74 can be positioned adjacent to the thread stop to allow enough clearance for tubing to be positioned over the first end of the drain port (e.g., connected to the drain port to route the flow of water). Drain port 40 can be attached to the tray bottom face using any method known or used in the art. For example, as shown in FIG. 3*c*, the drain port can comprise flange 78 that can be directly attached to exterior side of the bottom face of the tray (e.g., the side opposite the side that faces the tray interior compartment) via attachment area 77, which can include (but is not limited to) a heat seal area, adhesive area, welding area, mechanical closure area, and the like. Accordingly, the attachment area can comprise heat weld 79 or sonic weld to facilitate attachment of the drain port (via flange 78 in some embodiments) to the tray.

The drain port is provided for emptying the nutrient-laden water from the interior compartment of the tray to be recycled or disposed of. In some embodiments, drain port 45 can be disposed near the lowest point of tray 10, allowing for efficient draining of the nutrient-laden water as needed. A water pump can be connected via standard tubing to fill port 40 to fill the interior compartment of the tray with a desired amount of nutrient-laden water from a central reservoir. A further water pump can be connected to drain port 45 using standard tubing whereby nutrient-laden water in the tray can be pumped back to a central nutrient-laden water reservoir, to a different tray, or to be disposed of. In some embodiments, nutrient-laden water not absorbed by the plants can be repumped back through the same cycle (i.e., enters the tray through the fill port, exits the tray through the drain port, re-enters the tray through the fill port, etc.).

Figure 4A:
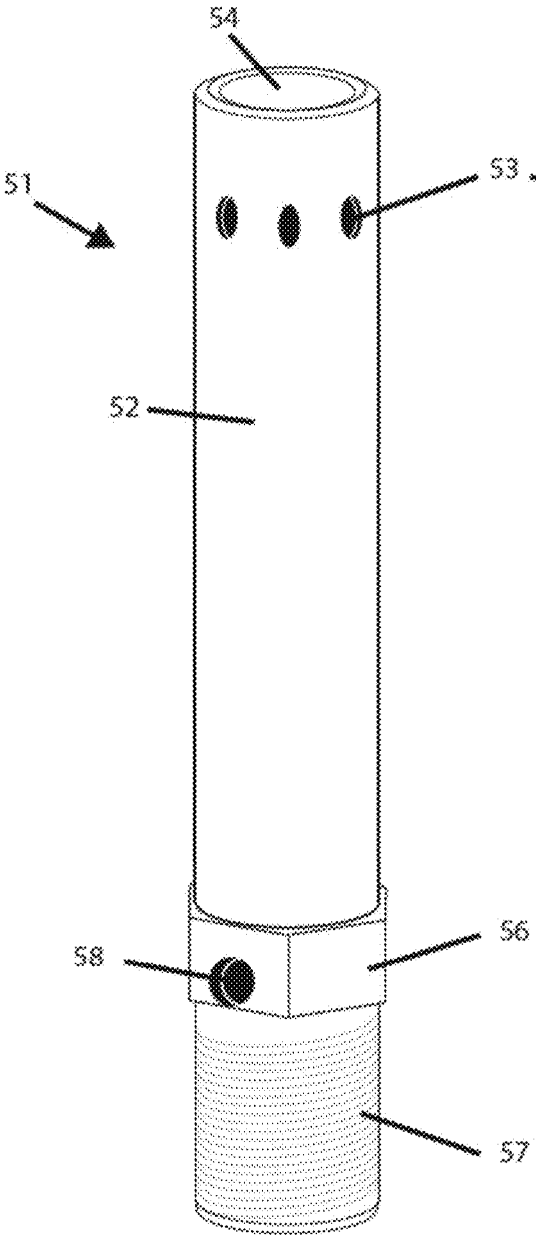
FIG. 4*a* is a perspective view of a drain tube in accordance with some embodiments of the presently disclosed subject matter.
Figure 4B:
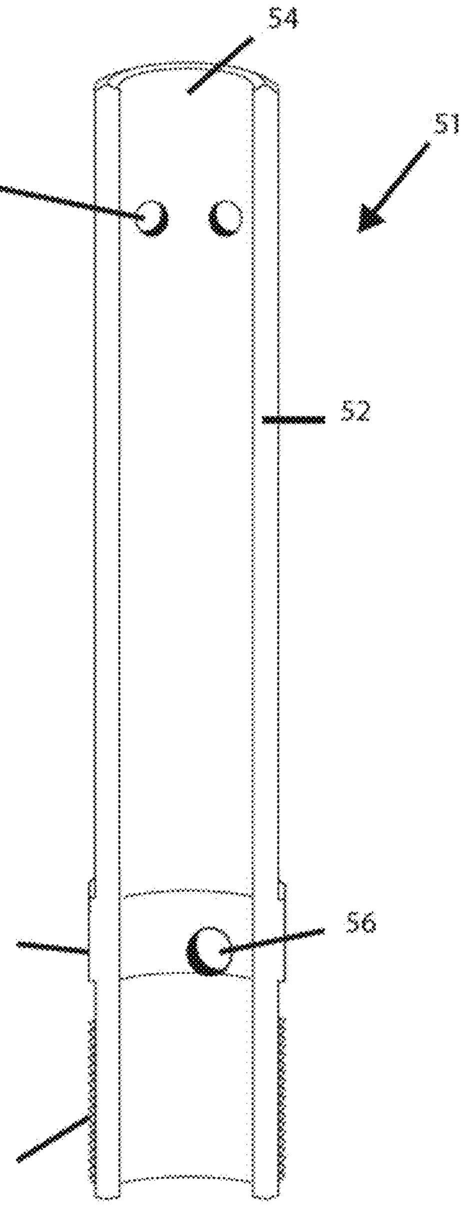
FIG. 4*b* is a cutaway view of the drain tube of FIG. 4*a.*

Water can exit drain port 45 via a drain tube to transport the nutrient-filled water to another tray, to a central water reservoir, or to be disposed of. One embodiment of a drain tube that can be used is illustrated in FIGS. 4*a* and 4*b*. Particularly, automatic drain tube 51 can passively control the water height inside tray 10. Drain tube 51 includes upper body 52 and one or more pre-overflow ports 53. The pre-overflow ports can be configured with larger/smaller holes or notches to screen large debris from the surface of the water. The height of upper body 52 to the pre-overflow ports determines and controls the water level by allowing the incoming flow of water to exit the pre-overflow ports positioned in the top portion of the upper body. When the flow of incoming water is too high, additional water accumulates and exits via overflow port 54 positioned at the top of the drain tube. As a result, the disclosed drain tube eliminates the need for a valve that opens and closes to drain the tray.

Figure 4C:
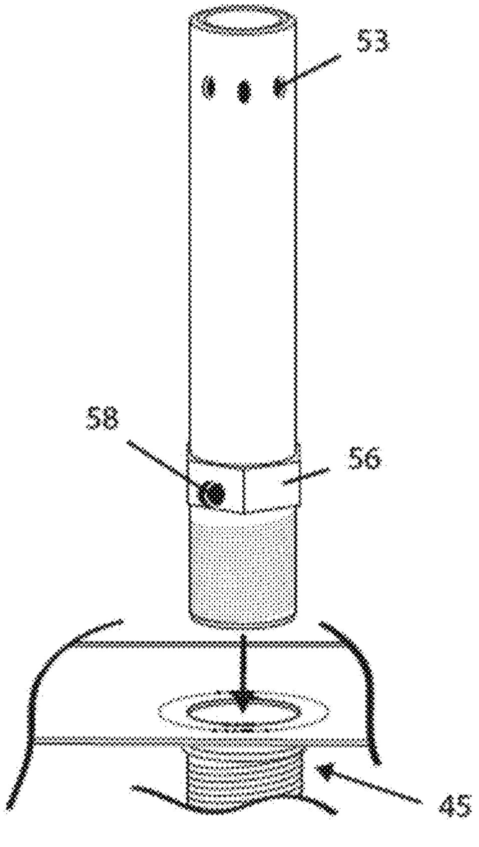
FIGS. 4*c* and 4*d* are perspective views of the drain tube in use in accordance with some embodiments of the presently disclosed subject matter.
Figure 4D:
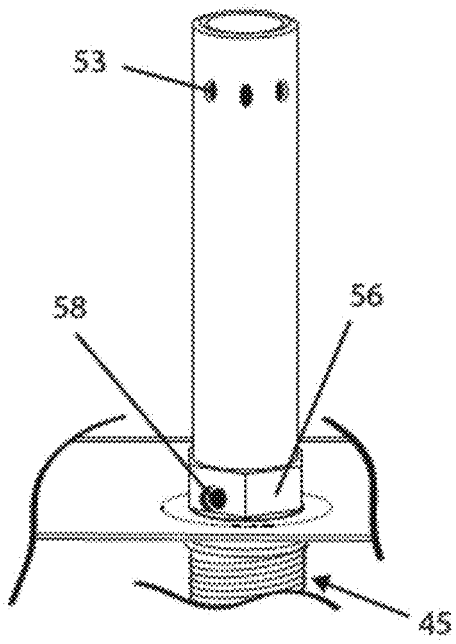

Drain tube 51 comprises flow port 58 that acts as a drain once the active flow of water has stopped within the interior of the tray. The drain tube is positioned into a gland, port, or drain hole in tray 10. Water can then travel via standard pipe or tubing to a reservoir, other tray (e.g., lower tray), or drain. In some embodiments, drain tube 51 can comprise stop 56 to prevent the tube from being inserted too far down the gland, port, or drain hole in the tray, thereby covering the flow port opening. In some embodiments, stop 56 can be positioned in a hexagonal shape, as shown in FIGS. 4*a* and 4*b*, to allow easy access with a standard tool if the tube gets stuck. The drain tube can optionally comprise threads 57 to provide a seal when positioned inside another tube or drain port 45, as shown in FIGS. 4*c* and 4*d*.

In some embodiments, ports 40, 45 can be pre-assembled in tray 10 prior to shipment to the end user. In this way, a fully operational system can be purchased that requires little or no preassembly prior to use. Fill port 40 and drain port 45 can include any type of port known and used in the art, including (but not limited to) gland ports, quick connect ports, spigots, spouts, hoses, bag-in-boxes, spouts for pouches (e.g., LBET, HOFFER®, Q35, Q351, QCD I, QCD II, DET, B1S, B2S, T215, LIQUI-SURE®, 287 Filaments, ELPO, 350TA, STARASEPT®, 225TT, E100 Fitments, Mix Pump Adaptors, 1527 Fitments Aseptic, non-aseptic, sizes from about 0.0125-3 inches), and combinations thereof.

Figure 5:
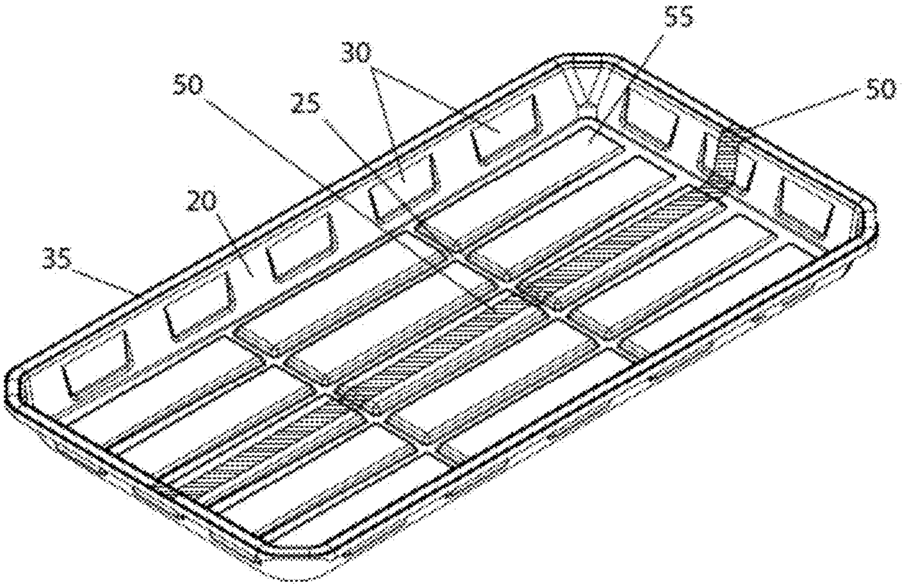
FIG. 5 is a perspective view of one embodiment of a tray indicator in accordance with some embodiments of the presently disclosed subject matter.

As shown in FIG. 5, in some embodiments, tray 10 can comprise one or more indicators 50 that allow the user to properly orient the tray for proper placement in support 15. For example, the tray indicator can align with a support indicator present on support 15. In some embodiments, indicator can include a line, arrow, or any other visual aid known or used in the art. In some embodiments, the indicator can be positioned on the tray sidewall 20, tray bottom face 25, and/or lip 35. In some embodiments, the indicator can be in a contrasting color, texture, and/or pattern compared to the tray.

Advantageously, tray 10 can have a thickness of about 0.3 inches or less (i.e., at least about or no more than about 0.3, 0.275, 0.25, 0.025, 0.2, 0.175, 0.15, 0.125, 0.1, 0.9, 0.8, 0.7, 0.6, 0.5, 0.4, 0.3, 0.2, 0.1, 0.09, 0.08, 0.07, 0.06, 0.05, 0.04, 0.03, 0.02, or 0.01 inches or less). Thus, in some embodiments, the tray has a thickness of about 0.187 inches, such as about 0.1-0.3, 0.125-0.25, 0.15-0.2, or 0.175-0.19 inches. However, the presently disclosed subject matter is not limited and tray 10 can be constructed to have a thickness that is greater or less than the range set forth above. In some embodiments, the tray is capable of holding liquids and/or plants within its interior compartment, but is not self-supporting due to its thickness. The term "self-supporting" as used herein refers to a structure that is sufficiently stiff to maintain a predetermined shape and to additionally support plants and/or nutrient-laden water.

In some embodiments, tray 10 can have a depth of about 3-12 inches (i.e., the distance between bottom face 25 and lip 35). Thus, the depth of the tray can be about 3, 4, 5, 6, 7, 8, 9, 10, 11, or 12 inches. However, the presently disclosed subject matter is not limited and tray 10 can have a depth greater or less than the recited range.

Tray 10 can be formed from a wide variety of materials known and used in the art. For example, in some embodiments, the tray can be constructed from polymeric materials, such as vacuum formable plastics, films used in packaging film manufacturing, etc. For example, suitable vacuum-formable plastics can include (but are not limited to) acrylonitrile butadiene styrene (ABS), acrylic polymethyl methacrylate (e.g., Perspex®, Oroglas®, Plexiglas®), copolyester (e.g., PETG, VIVAK®), polystyrene-polyphenylethene (e.g., HIPS, BEXTRENE®), polycarbonate (e.g., PC, LEXAN®, MAKROLON®), polypropylene, polyethylene (e.g., PE, HDPE, LDPE, PE foam), and copolymers and combinations thereof. Representative packaging films that can be used include (but are not limited to) polyvinylchloride (PVC), ethylene vinyl alcohol (EVOH) copolymer, ethylene vinyl acetate (EVA), metallocene polyethylene (mPE), polyethylene terephthalate (PET), foil, biaxially oriented polypropylene (BOPP), nylon, ionomer resin (Surlyn®), aluminium, and combinations thereof.

In some embodiments, the materials used to form tray 10 can include multilayer films. The term "multilayer film" refers to a thermoplastic material having one or more layers formed from polymeric or other materials (foil, paper, etc.) that are bonded together using any conventional or suitable method (e.g., coextrusion, extrusion coating, lamination, vapor deposition coating, solvent coating, emulsion coating, suspension coating, and combinations thereof). In some embodiments, the materials used to form the disclosed tray can comprise thin blown film sheets, including uniaxially, biaxially, and un-oriented multilayer films. The term "blown film" generally refers to a film produced by extruding a polymer melt from an annular die into a tube that is simultaneously pulled away from the die and over a bubble of air trapped between the die and collapsing element (such as nip rolls) while air is blown around the outer film tube surface to stabilize and quench the tube.

In some embodiments, the materials used to construct tray 10 are transparent. However, the presently disclosed subject matter also includes embodiments wherein the tray is constructed from opaque or partially opaque materials.

Tray 10 can be formed using any method known or used in the art. For example, in some embodiments the tray can be vacuum-formed. In general terms, vacuum forming refers to sheet forming methods, including drape forming, wherein a material (such as a polymeric material) is heated until it becomes pliable. The heated material is then placed over a mold and drawn in by a vacuum until it takes on a desired shape.

Figure 6:
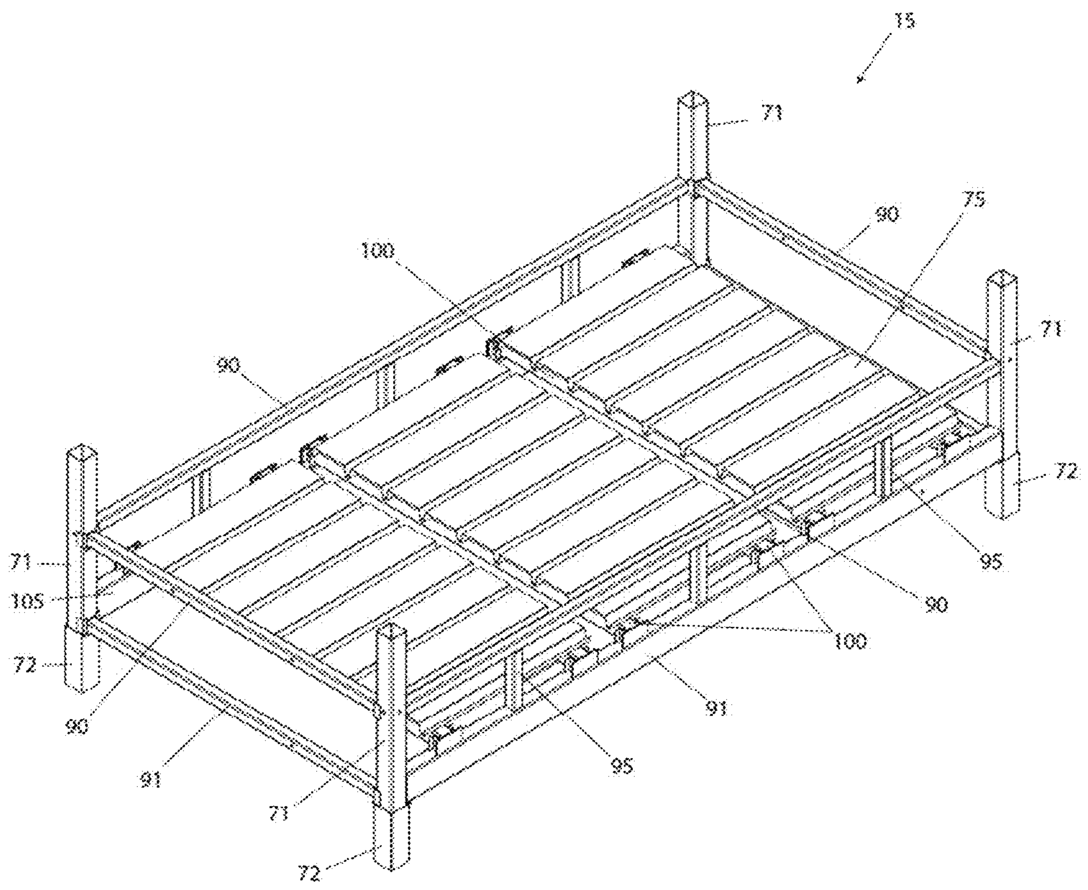
FIG. 6 is a perspective view of a support in accordance with some embodiments of the presently disclosed subject matter.
Figure 7A:
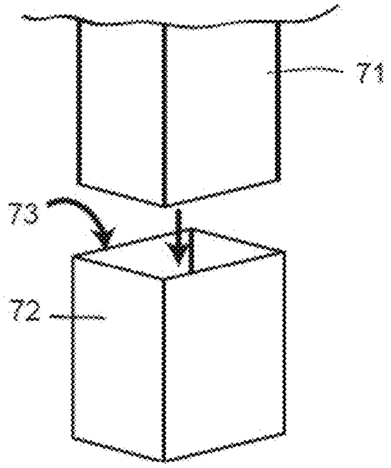
FIGS. 7*a*-7*f* are perspective views illustrating the interaction between the support legs and connectors in accordance with some embodiments of the presently disclosed subject matter.
Figure 7B:
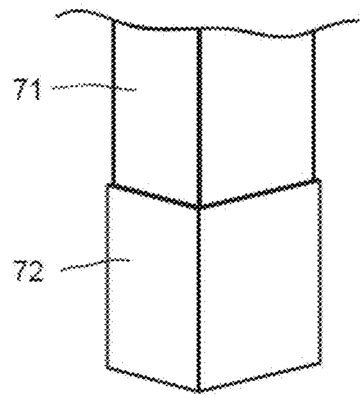
Figure 7C:
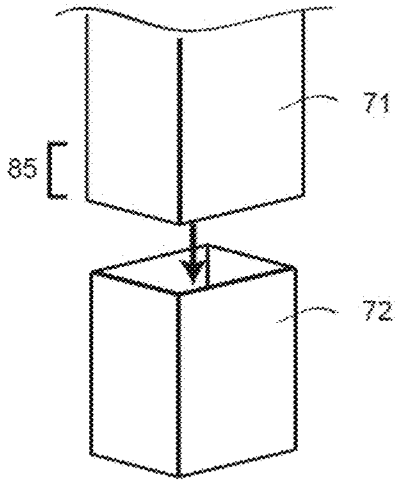
Figure 7D:
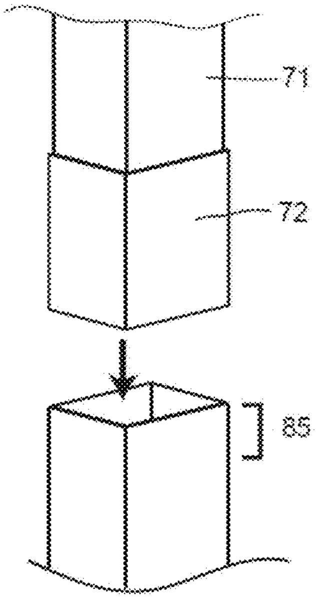
Figure 7E:
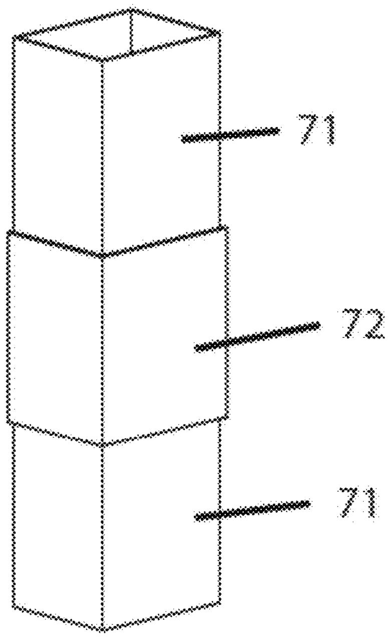
Figure 7F:
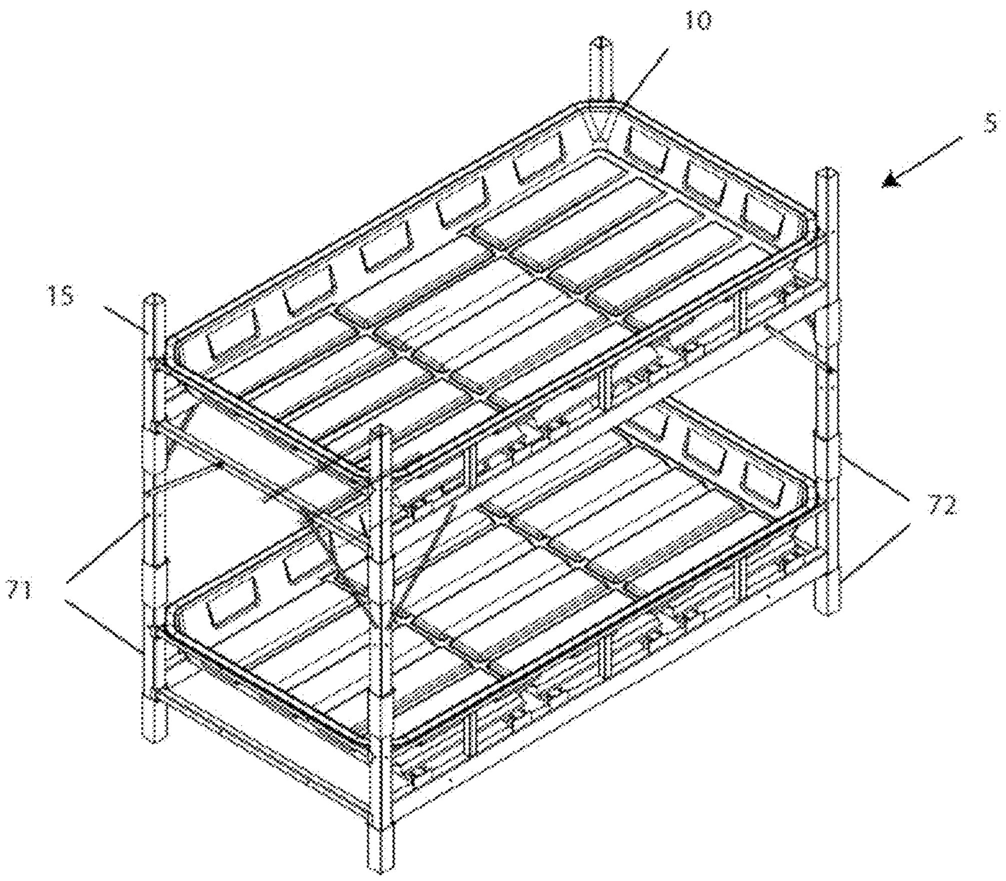

FIG. 6 illustrates one embodiment of support 15. Particularly, support 15 comprises a plurality of legs 71 (e.g., 4 legs as shown). The bottom end of each leg extends into connector 72 that rests on the ground or other surface and supports the weight of the system. Particularly, connector 72 is hollow and comprises recess 73 that extends through the entire length of the connector and corresponds approximately to the size and shape of the outer portion of leg 71. Thus, superimposed leg 71 fits into recess 73 of the connector, as shown in FIGS. 7*a* and 7*b*. Leg 71 is maintained within connector 72 using any mechanism known or used in the art, such as (but not limited to) adhesives, snap-fit arrangements, welding, mechanical closures (screws, pins, bolts, rivets, etc.), and the like. In embodiments wherein the supports are stacked, an additional connector 72 can be positioned on each leg 71 using adhesives, welding, mechanical closures, and the like. For example, as shown in FIGS. 7*c* and 7*d*, bottom portion 85 of leg 71 can fit into and attach to connector 72. The bottom portion of the connector can then connect to top portion 85 of a separate leg to arrive at the support of FIG. 7*e*. Accordingly, the supports are configured to be stackable in a nested configuration as shown in FIG. 7*f*.

As shown in FIG. 6, support 15 comprises horizontal top and bottom arms 90, 91 that connect to and are perpendicular or about perpendicular to adjacent legs 71. The legs and arms can be interlocked or can be welded together. In some embodiments, the arms can be joined to the legs at a position adjacent to connectors 72 or adjacent to the top or bottom portions of the legs. In some embodiments, the area between the top and bottom arms can comprise sidewalls 95 or bracing elements to provide additional support to the structure. As shown in FIG. 6, in some embodiments not all sides of the support include sidewalls 95. Rather, one or more sides can remain open (i.e., without sidewalls) to provide for a more lightweight structure and/or to allow for air circulation and access to the underside of the support if desired. In some embodiments, the open underside of the support allows access when the table is to be moved, such as by a forklift. In addition, the open areas under the support provide space for plants to grow in embodiments wherein the units are stacked. In some embodiments, there is about 8 feet or more of clear span beneath each table. The legs, connectors, arms, and sidewalls can be constructed from any of the wide variety of rigid materials known or used in the art, including (but not limited to) metal, polymeric materials, and the like. For example, the legs, connectors, arms, and/or sidewalls can be constructed from steel, stainless steel, aluminium, wood, galvanized steel, rigid and/or structural foam, or combinations thereof.

As shown in FIG. 6, support 15 further comprises a plurality of raised ridges 75 configured in the same or about the same size, shape, and number as the plateaus of the tray. The ridges span the interior of the support (i.e., the area between each arm and its opposite, parallel arm). Ridges 75 function to support plateaus 55, at least in part because the materials used to support the tray are thin, and the plants and vessels are typically heavy. Ridges 75 can be constructed from any of the wide variety of rigid materials known or used in the art, including (but not limited to) metal, polymeric materials, and the like. For example, in some embodiments, the ridges can be constructed from steel, stainless steel, polymeric materials, flexible foam, or combinations thereof. In some embodiments, ridges 75 can rest on or be supported by foundation 100, which can be positioned on top edge 105 of the bottom arms, as shown in FIG. 6. Alternatively, the presently disclosed subject matter also includes embodiments wherein the ridges rest directly on top edge 105 of the bottom arms and no foundation is required. It should also be appreciated that support 15 lacking a central metal portion can support a conventional table.

Figure 8A:
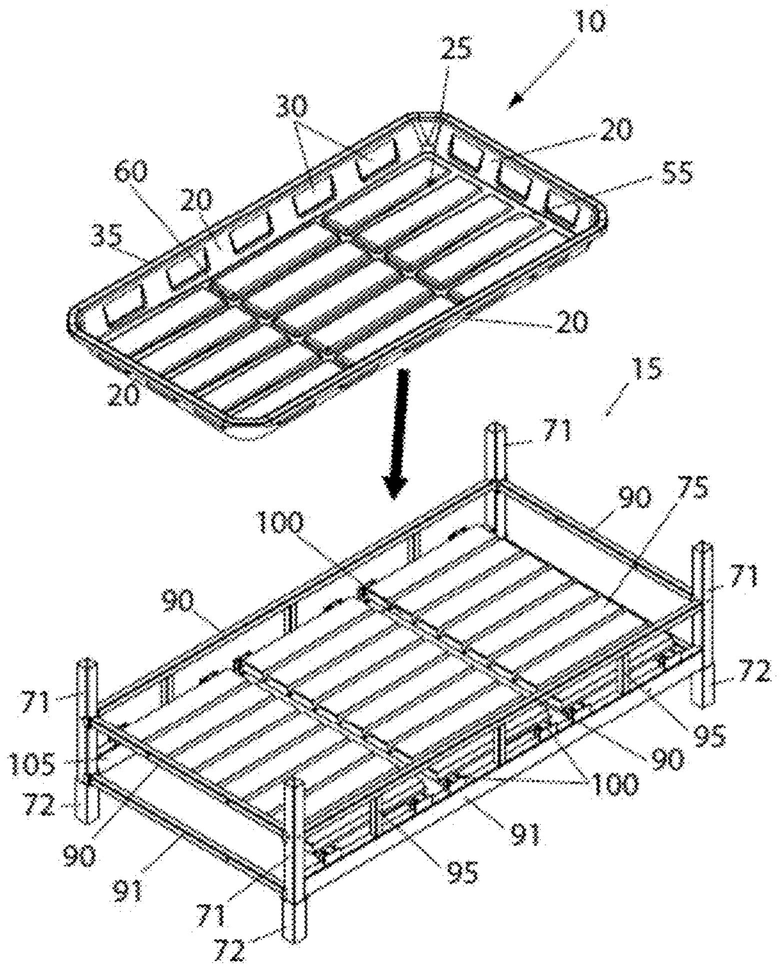
FIG. 8*a* is a perspective view illustrating the interaction between the tray and the support in accordance with some embodiments of the presently disclosed subject matter.
Figure 8B:
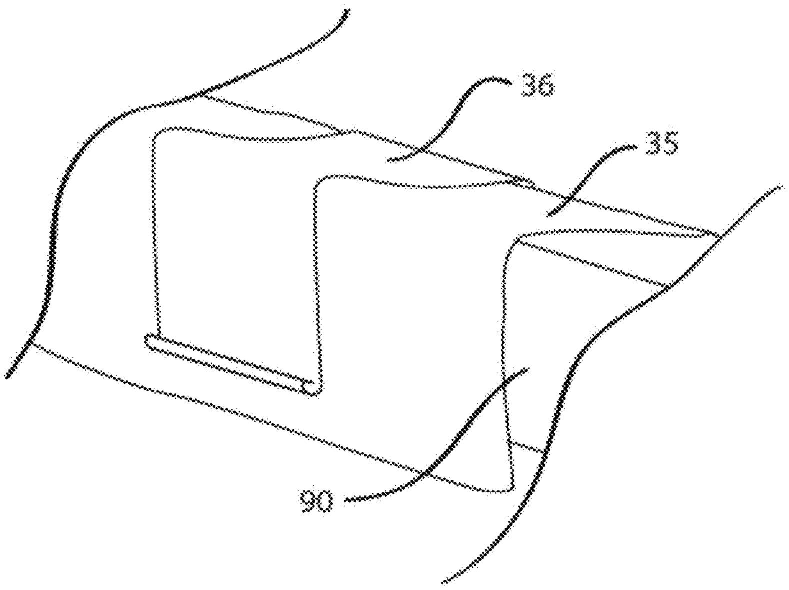
FIG. 8*b* is a perspective view illustrating one embodiment of a tray attached to a support.

As shown in FIG. 8*a*, in use tray 10 is positioned within support 15 such that plateaus 55 and ridges 75 are overlayed. In this way, the tray plateaus (constructed from a thin polymeric material) are supported by the ridges (constructed from rigid materials, such as metal). The tray can be maintained in the proper position on support 15 using any mechanical devices known or used in the art. In some embodiments, lip 35 of the tray can be secured to top arms 90 of the support using any of the wide variety of securing elements known or used in the art, including (but not limited to) clips, fasteners, mechanical elements (screws, pins etc.), tape, adhesives, straps, zip ties, and the like. For example, as shown in FIG. 8*b*, the securing element can comprise one or more clips 36 that removably attach lip 35 of the tray to arm 90 of the support. In some embodiments, conventional binder clips known or used in the art can be used. Alternatively or in addition, the tray can be maintained on support using a snap-fit, or other type of closure, which are well known in the art. In this way, the tray is removably connected to the support, to allow the tray to be removed and cleaned at any desired time.

The dimensions of table 5 can vary according the particular end use and desires of the end user. For example, in some embodiments, the dimensions of the table can have a width and length of about 4 feet×8 feet. However, the presently disclosed subject matter is not limited and can include greater or smaller dimensioned tables. Representative tables sizes include (but are not limited to) 4 feet×4 feet, 2 feet×8 feet, 2 feet×4 feet, and 1.5 feet×3 feet.

After the tray is properly positioned within support 15, a user can place plants and/or potted plants on top of plateaus 55. Any desired number of plants can be positioned on plateaus 55. For example, a user can position a single plant on each plateau, or multiple plants on each plateau, depending on the desired grow conditions and/or space requirements. The interior compartment of the tray can then be filled with a desired amount of nutrient-laden water via fill port 40 to a level that allows the plant roots access to the water. In some embodiments, the water is filled to a level above the height of plateaus 55. After a desired amount of time, the nutrient-laden water exits the tray via drain port 45 and is routed to another tray or to be recycled or disposed of.

Figure 9A:
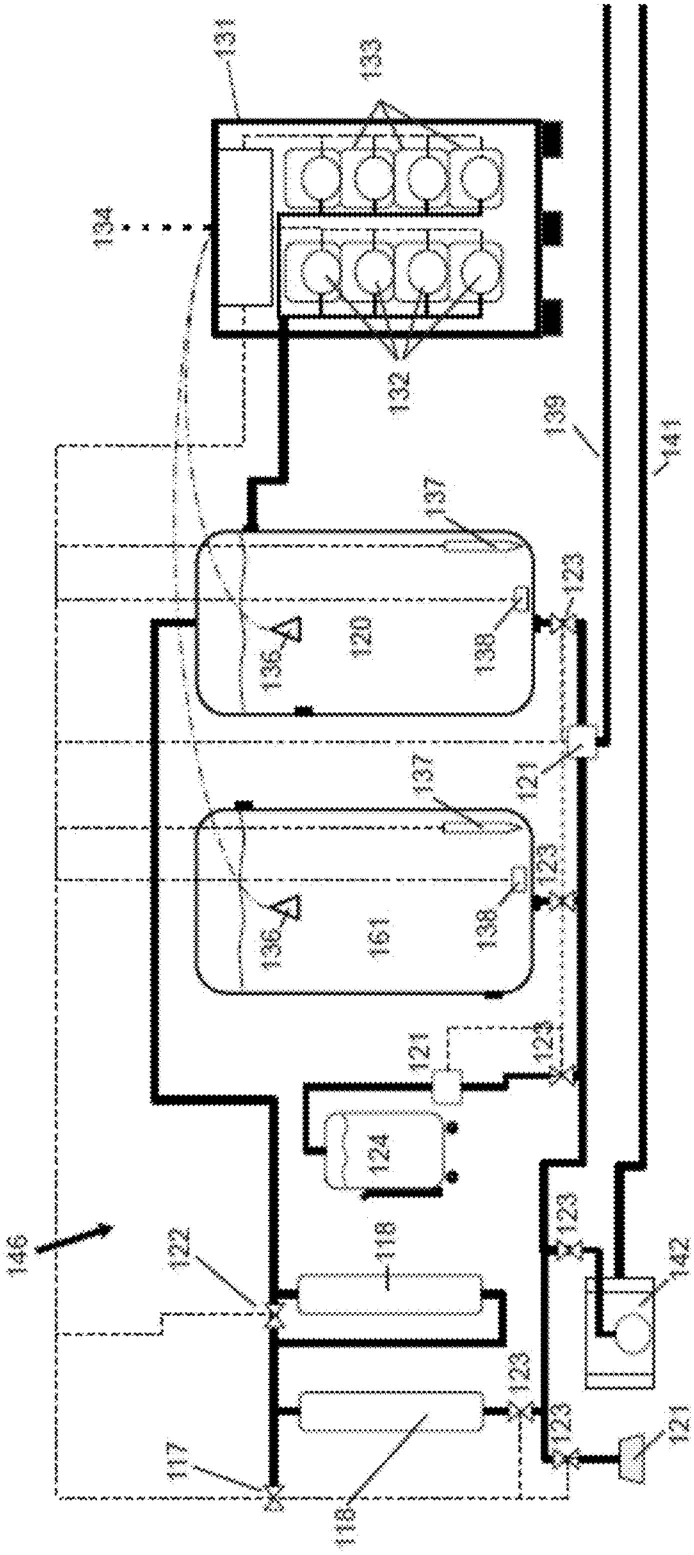
FIGS. 9*a* and 9*b* are schematic representations of the disclosed fertigation subsystem in accordance with some embodiments of the presently disclosed subject matter.
Figure 9B:
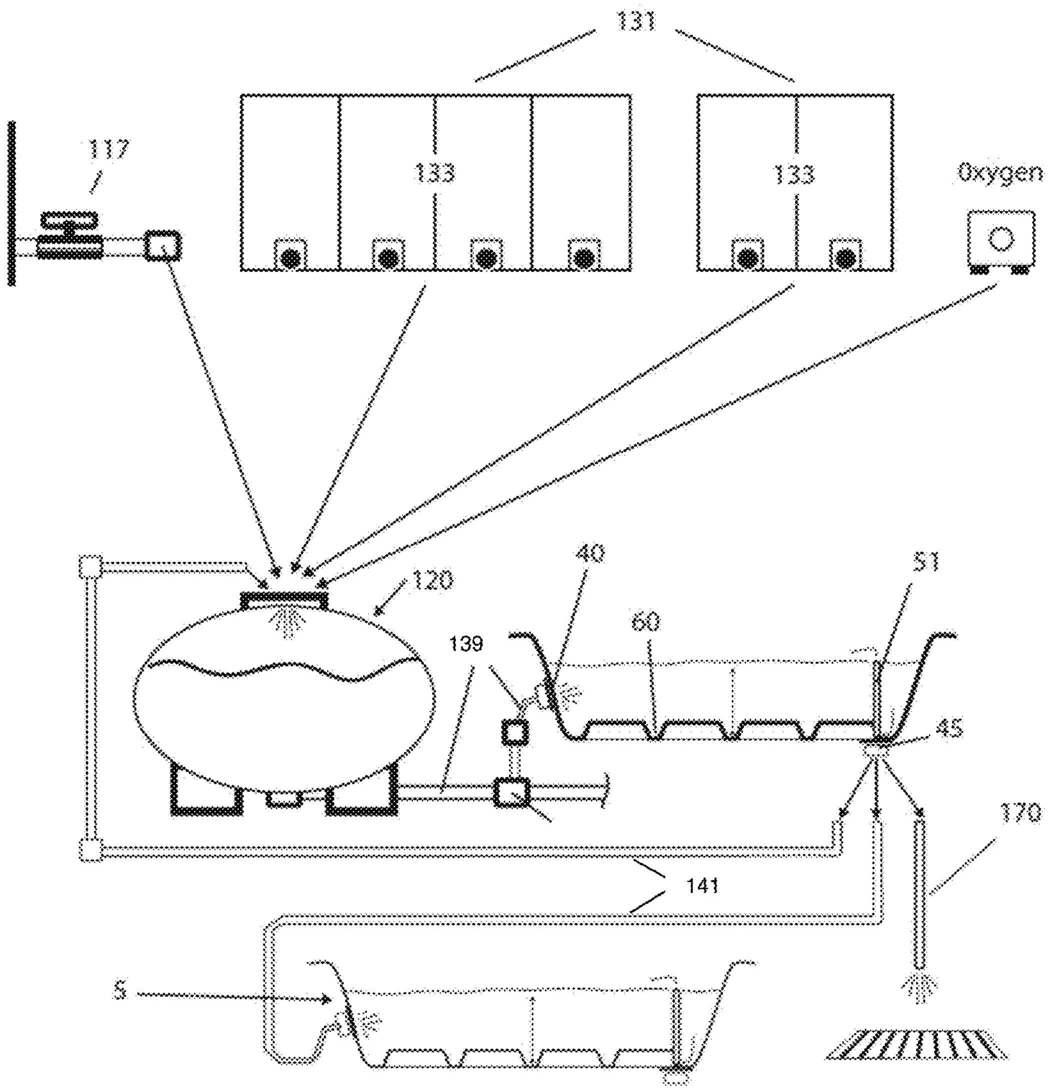

The presently disclosed subject matter is further directed to a hydroponic system that comprises table 5, a fertigation subsystem, a lighting subsystem, and a control subsystem. FIGS. 9*a* and 9*b* illustrate one embodiment of fertigation subsystem 110. As used herein, the term "fertigation" refers to the injection of fertilizer into an irrigation system. As shown in the embodiment of FIG. 9*a*, a desired amount of water can be supplied from a water supply line to main reservoir 120 via water supply valve 117. The water can be optionally passed through one or more filters 118 to remove materials such as solids that can be problematic (e.g., clogging the system, skewing readings, and/or harming the plants). Suitable filter systems are well known in the art and can include (but are not limited to) ultrafiltration filters, microfiltration filters, slow sand filters, and the like. The particulates filtered from the water can be deposited via valve 123 to drain 121, which in some embodiments can lead to a sewer or other disposal element. In some embodiments, the system can comprise filter bypass valve 122 for use in embodiments wherein the user desires to bypass the filtration of the water. Water then is transported to main reservoir 120.

Fertilizer and additives from fertigation element 131 are also added to main reservoir 120. For example, desired amounts of additives and/or nutrients (nitrogen, phosphorous, potassium, etc.) can be pumped from fertigation element 131 to the main reservoir via pumps 132, which in some embodiments can be peristaltic pumps. In some embodiments, the additives and nutrients are separately housed within fertigation element 131, such as in bag-in-a-box containers 133. In addition to nutrients, acids and bases can be housed within fertigation element 131 to allow for pH adjustment of the nutrient-laden water within the main reservoir. In some embodiments, the nutrients can be added during filling of the reservoir with water, and the pH can be adjusted after the nutrients have been added. The system can comprise a submersible pump positioned within the reservoir to ensure proper mixing of the nutrients, additives, and the water.

The addition of nutrients and/or additives to the main reservoir can be accomplished through skid mounted controls. In some embodiments, the addition of nutrients and/or additives can be controlled through communication element 134, which can comprise cloud communication elements, such as Wi-Fi, cell phone, ethernet, and the like.

Thus, fertigation subsystem 110 provides for automatic addition of nutrients and additives to water, based on user input, plant information, and the like. For example, the system can automatically adjust the pH (up/down), add nitrogen, phosphorous, iron, and/or other nutrients to a desired final concentration. The nutrients can be added and/or the pH adjusted manually, or the system can include nutrient pumps or pH adjusters linked to a controller to automatically adjust the reservoir water to desired parameters. In some embodiments, the materials being added to the water in the reservoir are labeled to allow the system to track what is added. For example, the materials can include sensors, transponders, RFID tags, and the like. Thus, the system can read and manage the pH levels, the oxygen levels, the water level, the additives (i.e., dissolved solids, salts, nutrients, and the like), and/or the temperature according to the user's input or based on the particular plant grown. The sensors can be connected to a communication element 134 and have unique identification numbers and tags, so that a controller can track and record input and take appropriate action.

In some embodiments, overflow nutrient-laden water can be pumped from main reservoir 120 to bulk storage reservoir 161 via pump 121. The bulk storage reservoir can be configured as a container or other vessel, sized to house a large volume of nutrient-laden water for later use. Any of the wide variety of pumps known or used in the art can be used with the disclosed system. As shown, one more valves 123 can be opened or closed to selectively allow movement of water to and from the main reservoir and/or the bulk storage reservoir. In some embodiments, nutrient-laden water can be pumped to portable tank 124 that can be moved to a desired location for use. In some embodiments, the main reservoir and bulk storage reservoir can comprise sensors 136 that determine the temperature, pH, oxygen level, and/or nutrient makeup of the stored water. The sensor information can be communicated to fertigation element 131 to allow the proper amount of nutrients, pH adjustment, etc. to be determined and added.

In some embodiments, main reservoir 120 and/or bulk storage reservoir 161 comprise heater 137 and/or bubbler 138. Heater 137 can be used to raise the temperature of the nutrient-laden water housed within the reservoirs, and bubbler 138 can be used to add oxygen to the nutrient-laden water. The heater and the bubbler can be connected to the control system to allow the conditions within the reservoirs to be controlled and/or altered.

The fertigation subsystem comprises feed line 139 by which nutrient laden water is routed to the grow rooms and tables. In some embodiments, pump 122 is positioned in the feed line to convey the nutrient-laden water from the main reservoir or bulk storage reservoir to fill port 40 and channels 60 of the tray. The irrigation subsystem further comprises return line 141 comprising sump and pump 142 to route nutrient-laden water from the drain port in a tray back to drain 121 or to be filtered and returned to the main reservoir. Alternatively, in some embodiments, once fluid leaves a tray, it can be routed to a different tray via feedline 139. However, in some embodiments, fluid can be routed from tray drain port to a drain or other outlet for disposal. In some embodiments, the feed line and/or return line can comprise one or more valves to regulate the flow of nutrient-laden water into and out of the tray. Any valves known or used in the art can be used, including (but not limited to) gate valves, duck valves, flapper valves, umbrella valves, butterfly valves, ball valves, check valves, diaphragm valves, pinch valves, poppet valves, piston valves, needle valves, pressure reducing valves, and the like. The valves can be manually operated, or can be electrically controlled by the timing system and/or by a suitable controller, such as (but not limited to) a microprocessor. Dotted line 146 illustrates the communication and control lines of the disclosed system.

The tray channels allow all or about all of the nutrient-laden water to drain from tray 10. As a result, no standing water remains in the tray. Pumps allow either continuous or intermittent flow of nutrient-laden water. For example, in some embodiments, the system can comprise a timing element, such as a clock, digital clock, or controller (e.g., computer) to regulate the timing, volume, and/or flow rate of the nutrient-laden water. Main reservoir 120 and/or bulk reservoir 161 thus act as a repository from which and to which the nutrient-laden water is pumped or flows during operation of the system.

Figure 10A:
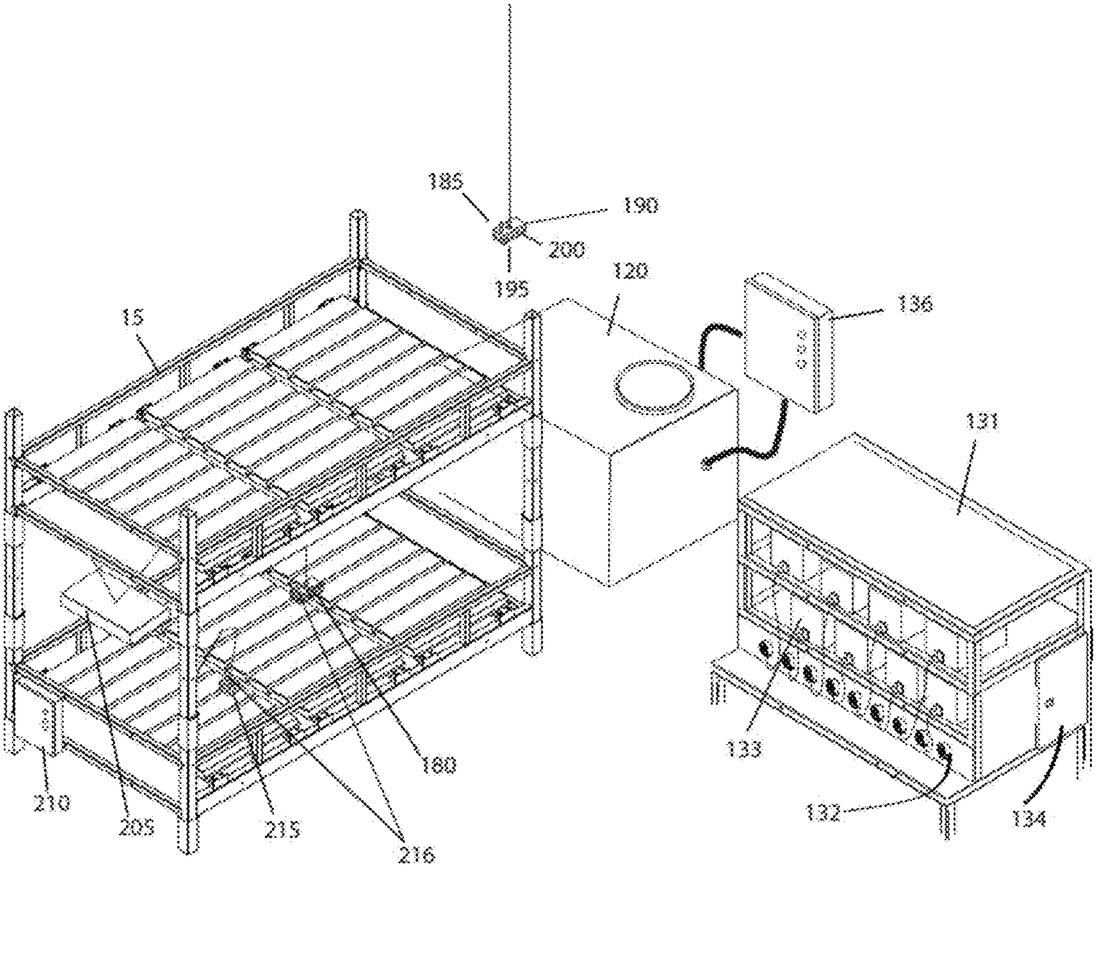
FIG. 10*a* is a schematic illustrating one embodiment of an environmental subsystem in accordance with the presently disclosed subject matter.

The presently disclosed system matter further comprises environmental subsystem 180 that controls and maintains the area surrounding the disclosed table(s), as shown in FIG. 10*a*. In some embodiments, the temperature, relative humidity, and/or air levels (e.g., $CO_2$) can be read, recorded, and controlled for a given grow area 185. For example, if the temperature varies more than an acceptable amount from the set growing condition parameters, temperature adjustment element 190 can cool or heat the air to return the internal air temperature to acceptable levels. Similarly, if the relative humidity level within the system is too high/low, the system can initiate a humidity control element 195 to alter the humidity levels to a desired range. Suitable humidity control elements can include (but are not limited to) mist generators and dehumidifiers. For example, when the humidity control element is a dehumidifier, the water removed from the system can be pumped from the system using pump 142 and drain line 191. Further, if the level of $CO_2$ within the system is too high/low, the system can correct the levels using air control element 200. Accordingly, the disclosed environmental subsystem provides for control and/or monitoring of humidity levels, water temperature, water levels, pH, and the like within housing 185 or other closed environment comprising the disclosed hydroponic tables 5, as shown in the graphic illustration of FIG. 10*a*.

Figure 10B:
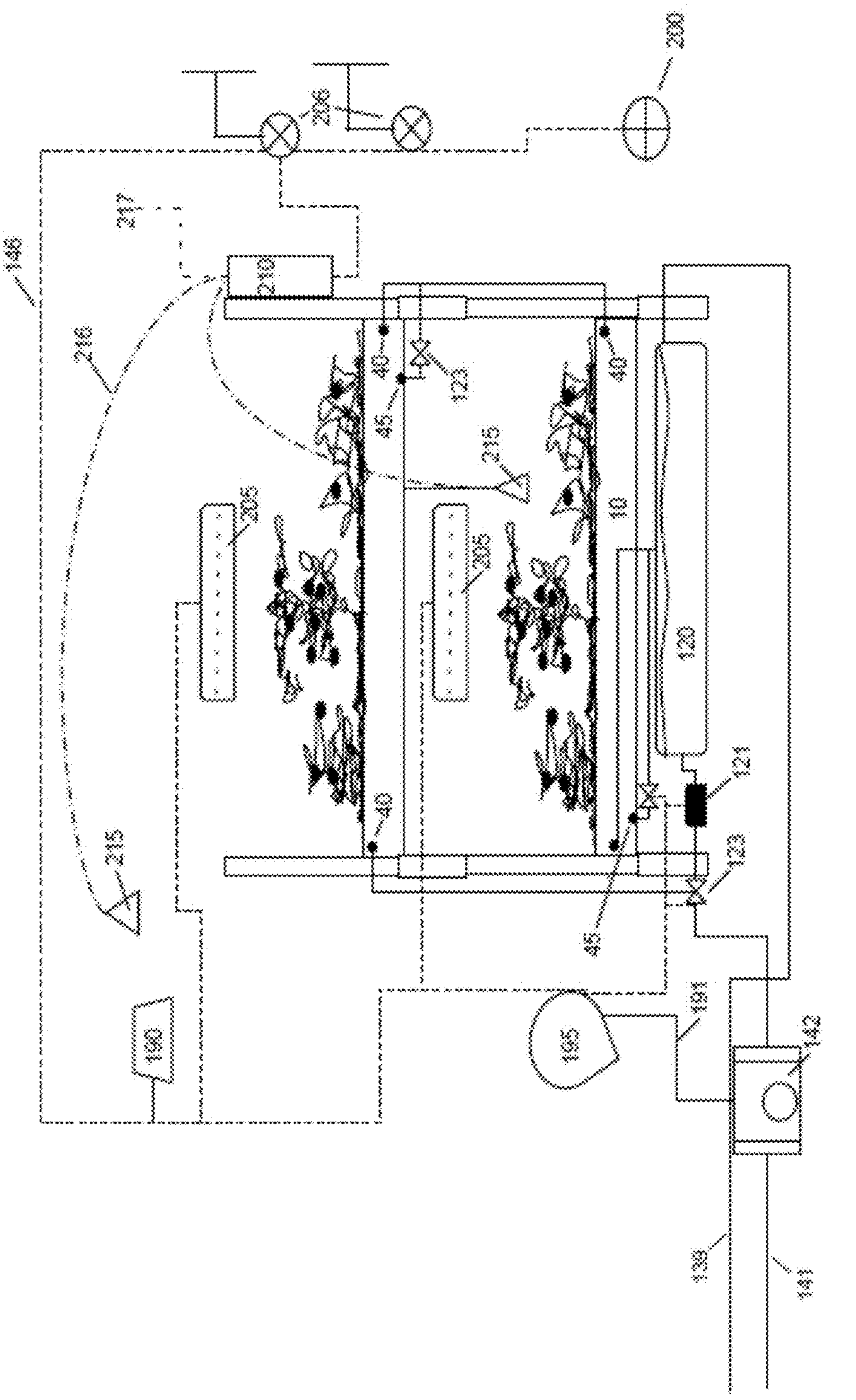
FIG. 10*b* is a front plan view of one embodiment of an environmental subsystem in accordance with the presently disclosed subject matter.

Environmental subsystem 180 can further manage the lighting conditions, as shown in FIG. 10*b*. Light source 205 is an artificial light source, generally an electric light, designed to stimulate growth by emitting an electromagnetic spectrum appropriate for photosynthesis. Grow lights are used in applications where there is either no naturally occurring light, or where supplemental light is required. Artificial light sources to be used in the disclosed system can be provided in a light unit positioned adjustably above the plants to be grown. For example, separate LEDs can be used for each of the spectral ranges of light to be utilized. Thus, each plant can be grown under lighting conditions that can be adjusted depending on the growth phase and/or the needs of the plant being cultivated. The spectral characteristics of the lights can be adjusted either linearly or stepwise. As shown, a plurality of tables 5 can be vertically stacked to a height of between about two and eight levels. The disclosed lighting system can provide light above and in close (but not overly close) proximity to each of the tables.

In addition to a proper spectral range, light source 205 can also be customized to provide adequate light intensity to meet the plant's requirements. In this respect, photosynthetic active radiation (PAR) is normally quantified as μmol photons $m^{-2}s^{-1}$ (micromoles of photons per square meter per second), which is a measure of the photosynthetic photon flux density (PPFD). In the southern hemisphere, full sunlight at noon during summer is about 2000 PPFD, and about 1000 PPFD during winter. Typically, plants require PPFD of about 200 to about 700 μmol $m^{-2}s^{-1}$ for their growth and development. The lighting conditions for each plant can be monitored, tracked, and recorded using sensors. For example, in some embodiments, sensors can be positioned on the plants, the tray, the table, next to the lighting elements, etc.

The disclosed system can further comprise environmental control element 210 that can take the form of a programmed computer or other processor-based system or device. The control element can be configured to accept data inputs from the system sensors and manual imports and to perform one or more necessary calculations to determine starting and stopping times for an irrigation event, light source calculations, corrections for relative humidity, temperature, and the like.

The control system therefore provides one or more sensors 215 that can be positioned in the plant canopy, on tray 10, on support 15, light source 205, on one or more representative plants, and/or in different areas of the room to measure and control air temperature, water temperature, water input, water output, $O_2$, $CO_2$, lighting output, lighting timing, PAR, spectrum, etc. The system can comprise one or more circulation elements 206, such as fans, to allow the sensors to get an accurate reading of the conditions. The sensors can transmit data via communication element 216, which can be a wired or wireless system. In some embodiments, the sensors can transmit information to the cloud 217 via wi-fi, GSM, or the ethernet. In some embodiments, the system comprises an optical sensor and/or light spectrum control to see the growth of mold, fungus, and/or bacterium. The lighting, for example, can be controlled via wires or Wi-Fi in some embodiments.

The control system can comprise a data recording element that can read data transmitted from the sensors. From the sensor data, the system can change or correct environmental conditions to maintain a desired environment within housing 185. In some embodiments, the data can be recorded to show the user how growth is maintained so that growth can be optimized. In some embodiments, each plant can be sensed using plant sensor. The plant sensor can be any suitable sensor known or used in the art. For example, a 2D barcode and/or RFID tag can be used. The plant sensors can be used to track growth. For example, one type of each plant can be used to track and follow which plant is given which growth conditions. The sensors can be positioned on the seed packets, clines, plants (via tag), trays, supports, racks, rooms, and/or fertilizer containers. Using the information provided, the plant type can be recorded, growing parameters can be set. Further, the user can establish what products were added to the grow environment. The tracking system further prevents unauthorized materials from entering the system. Entry of specific plant movement in the system can be hastened. The room can further be scanned to determine which plants are present, and their locations. Conditions can be linked to plants, and the plant results of the grow can be linked to the grow environment.

Figure 11:
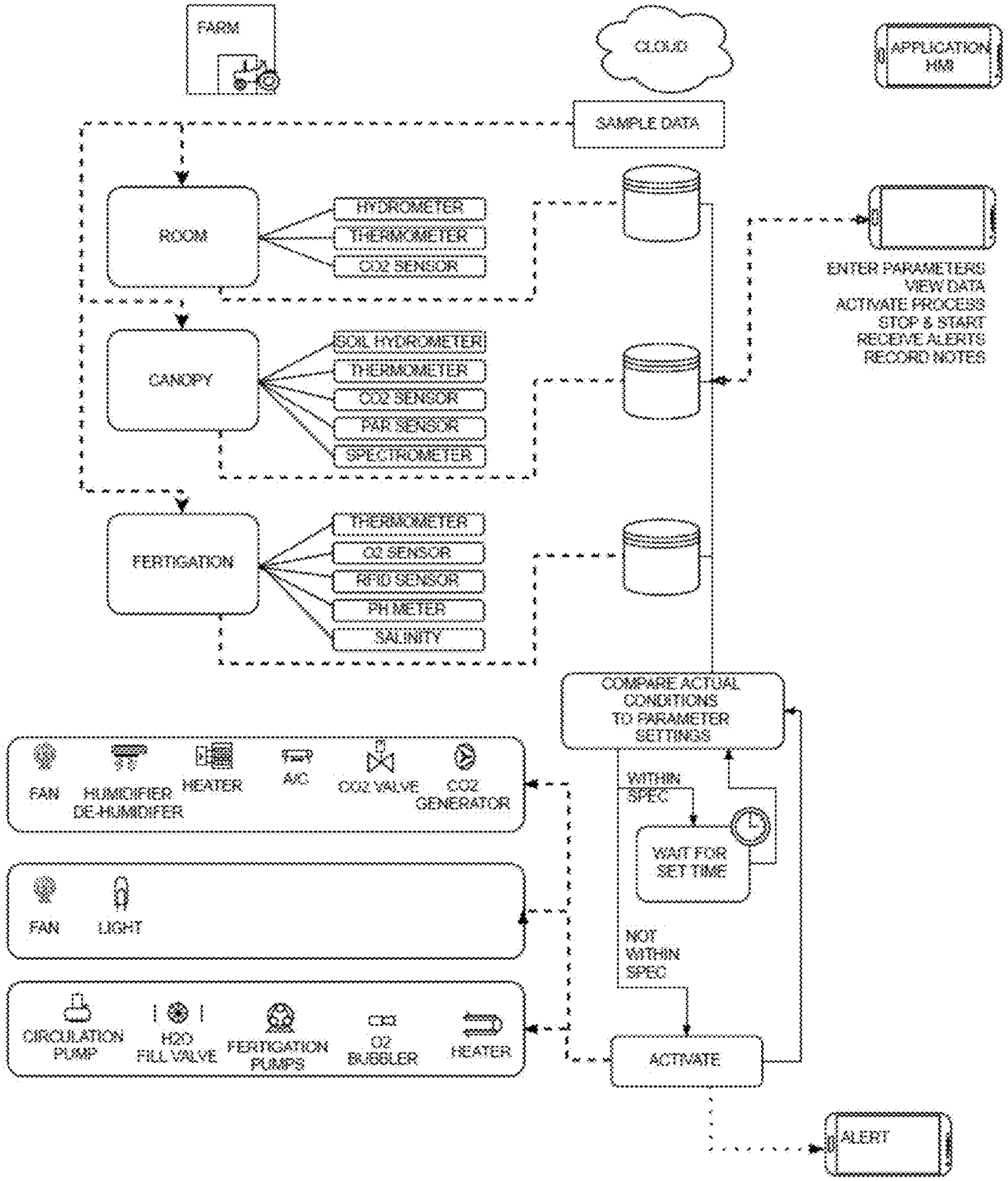
FIG. 11 is a schematic illustrating one embodiment of a control system in accordance with some embodiments of the presently disclosed subject matter.

In some embodiments, the control system can include a remote server that can communicate with the one or more sensing devices and receive data captured by the sensors and store the captured data on the server, as shown in FIG. 11. In some embodiments, the remote server can be cloud-based. A user device can be in communication with the remote server and send a query (via a user interface on the user device) about an environmental condition of the disclosed system. In response to the user's request, the remote server can extract relevant data from stored data and transmit it to the user device. In some embodiments, the user device can display the resulting data to the user via its graphical user interface. In some embodiments, the user can use a handheld device to establish and change environmental settings and/or record plant outcomes and movements. For example, in some embodiments a sensor (such as a 2D barcode system) can be used to identify plant movement in the hydroponic environment. Particularly, the handheld device can serve as an I/O device and can include a display (e.g., LCD) to display information and user actuatable controls (e.g., user selectable keys, icons, buttons, etc.). The user can manipulate the controls to select parameters or programs to execute controls over one or more environmental characteristics of the growing environment. In some embodiments, the handheld device can execute a downloaded customized application ("app") that communicatively interfaces via a wireless protocol (e.g., Wi-Fi, Bluetooth, etc).

When it is desired to disassemble the system, water can be drained from the tray via the exit port and flows via the drain line to the reservoir or to be recycled/disposed of. The system can be unstacked (if stacked) using a forklift or other mechanism. Plants and/or pots can be removed manually or via forklift or other mechanical elements. The trays can then be unclipped and removed from the support, cleaned and then reused at a later time. Lighting systems can be disassembled as desired.

Advantageously, the disclosed system provides for improved crop growth because the plant has a balanced nutrient bath, providing nutrients, pH levels and the like specific to that plant. Plant growth has further been optimized because water at a proper temperature and air is readily available, each plant need not struggle to grow. Consequently, plant growth, and thus taste and quality, are optimized. In addition, the stacked system design increases the area available for plant growing, thereby increasing production and yields.

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. A hydroponic assembly comprising:

a tray comprising:

- a plurality of sidewalls joined to a bottom face to provide an interior compartment,
- a plurality of raised plateaus configured on the bottom face of the tray;
- a plurality of channels defined on the bottom face, positioned between the raised plateaus;
- a fill port positioned on one sidewall;
- a drain port positioned on the bottom face;
- a lip positioned at a top edge of the sidewalls extending about the perimeter of the sidewalls;

a support comprising:

- a plurality of legs comprising a top portion and a bottom portion;
- a plurality of connectors comprising an internal recess sized and shaped to house the plurality of legs;

horizontal arms connecting the legs; and a plurality of raised ridges, sized and shaped to conform to the size and shape of the plurality of raised plateaus;

wherein the lip is configured to rest on the top portion of the horizontal arms, wherein the raised plateaus are supported by the raised ridges, and wherein the hydroponic assembly is configured to be vertically stackable.

2. The hydroponic assembly of claim 1, wherein the tray has a thickness of about 1 inch or less.

3. The hydroponic assembly of claim 1, wherein the raised plateaus have a height of about 1-2 inches.

4. The hydroponic assembly of claim 1, wherein the area beneath the raised ridges is open.

5. The hydroponic assembly of claim 1, wherein the support is vertically stackable.

6. A hydroponic growing system comprising:

a hydroponic assembly comprising:

a tray comprising:

a plurality of sidewalls joined to a bottom face to provide an interior compartment, a plurality of raised plateaus configured on the bottom face of the tray;

a plurality of channels defined on the bottom face, positioned between the raised plateaus;

a fill port positioned on one sidewall;

a drain port positioned on the bottom face;

a lip positioned at a top edge of the sidewalls extending about the perimeter of the sidewalls;

a support comprising:

a plurality of legs comprising a top portion and a bottom portion;

a plurality of connectors comprising an internal recess sized and shaped to house the plurality of legs;

horizontal arms connecting the legs; and a plurality of raised ridges, sized and shaped to conform to the size and shape of the plurality of raised plateaus;

wherein the lip is configured to rest on the top portion of the horizontal arms, wherein the raised plateaus are supported by the raised ridges, and wherein the hydroponic assembly is configured to be vertically stackable;

an irrigation subsystem;

an environmental subsystem; and a control subsystem.

7. The system of claim 6, wherein the irrigation subsystem comprises a reservoir housing water comprising dissolved nutrients;

a feed line connecting the reservoir to the fill port of the tray; and a return line connecting the drain port of the tray with the reservoir, a fill port of another tray, or a disposal element.

8. The system of claim 7, wherein nutrients are automatically added to the water within the reservoir, the pH of the water within the reservoir is automatically adjusted, or both based on user input or plant information.

9. The system of claim 8, further comprising one or more sensors to read and manage pH, oxygen level, water level, additives, temperature, or combinations thereof of the water within the reservoir.

10. The system of claim 9, wherein the sensors are connected to a communication element to allow a controller to track and record input and take appropriate corrective action.

11. The system of claim 6 wherein the environmental subsystem controls and maintains the area surrounding the hydroponic assembly.

12. The system of claim 6, wherein the environmental subsystem comprises:

sensors to read and record temperature, relative humidity, air levels, or combinations thereof within the hydroponic growing system; and controllers to take corrective action to return the hydroponic growing system to desired parameters.

13. The system of claim 6 wherein the environmental subsystem comprises a plurality of light sources customized for a desired growing condition.

14. The system of claim 13, wherein the light sources are configured above the raised plateaus.

15. The system of claim 13, wherein the light sources, intensity, or both are customized based on a desired growing condition.

16. The system of claim 6, wherein the control subsystem comprises a programmed computer or other processor-based device.

17. The system of claim 16, further comprising one or more sensors that can measure air temperature, water temperature, water input, water output, oxygen concentration, carbon dioxide concentration, pH, nutrients, lighting output, lighting timing, PAR, spectrum, and combinations thereof.

18. The system of claim 17, further comprising a controller configured to accept data inputs from the sensors to perform one or more necessary calculations related to an irrigation event, injection rates for components used to adjust the nutrients or pH, light source calculations, corrections for relative humidity, temperature, or combinations thereof.

19. The system of claim 17, further comprising a data recording element configured to read data transmitted from the sensors.

20. The system of claim 17, further comprising a remote server that can communicate with the one or more sensing devices and receive data captured by the sensors and store the captured data on the remote server.

* * * * *